(12) United States Patent
Zoldi et al.

(10) Patent No.: US 11,367,074 B2
(45) Date of Patent: Jun. 21, 2022

(54) HIGH RESOLUTION TRANSACTION-LEVEL FRAUD DETECTION FOR PAYMENT CARDS IN A POTENTIAL STATE OF FRAUD

(71) Applicant: FAIR ISAAC CORPORATION, Roseville, MN (US)

(72) Inventors: Scott M. Zoldi, San Diego, CA (US); Hila Hashemi, Rancho Santa Fe, CA (US); Todd Alan Smith, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 648 days.

(21) Appl. No.: 15/338,218

(22) Filed: Oct. 28, 2016

(65) Prior Publication Data

US 2018/0121922 A1 May 3, 2018

(51) Int. Cl.
*G06Q 20/40* (2012.01)
*G06F 16/2457* (2019.01)
*G06Q 40/02* (2012.01)
*G06Q 20/34* (2012.01)
*G06Q 10/06* (2012.01)

(52) U.S. Cl.
CPC ... *G06Q 20/4016* (2013.01); *G06F 16/24578* (2019.01); *G06Q 10/0635* (2013.01); *G06Q 20/34* (2013.01); *G06Q 20/409* (2013.01); *G06Q 40/025* (2013.01)

(58) Field of Classification Search
CPC ......... G06Q 20/40; G06Q 20/34; G06F 17/30
USPC ....................................................... 705/44
See application file for complete search history.

(56) References Cited

U.S. PATENT DOCUMENTS

| | | | | |
|---|---|---|---|---|
| 5,991,713 A * | 11/1999 | Unger | ............... | H03M 7/3084 704/1 |
| 7,263,492 B1 * | 8/2007 | Suresh | ............... | G06Q 10/10 705/2 |
| 8,090,648 B2 * | 1/2012 | Zoldi | ............... | G06Q 10/10 705/38 |
| 8,706,474 B2 * | 4/2014 | Blume | ............... | G06F 17/278 704/2 |
| 8,819,227 B1 * | 8/2014 | Keralapura | ............ | H04L 45/38 709/203 |

(Continued)

FOREIGN PATENT DOCUMENTS

EP 2 790 146 A1 10/2014

OTHER PUBLICATIONS

Dictionary.com (Unabridged) definition of "recursion", which is based on the Random House Unabridged Dictionary, © Random House, Inc. (2021). https://www.dictionary.com/browse/recursion (Year: 2021).*

*Primary Examiner* — Narayanswamy Subramanian
*Assistant Examiner* — Ayal I. Sharon
(74) *Attorney, Agent, or Firm* — Mintz Levin Cohn Ferris Glovsky and Popeo, P.C.

(57) ABSTRACT

A system and method are disclosed, to distinguish fraudulent transactions from a legitimate transaction, predicated on the notion that the card is considered likely to be in state of fraud. The disclosed system and method can be activated as soon as an account has suspicious activity that causes a high score for potential fraud, but before a bank either can or needs to confirm fraud. The system or method is able to pinpoint the actual fraudulent transactions inside a window of potential fraudulent activity, using a specialized model referred to as the pinpoint model.

15 Claims, 5 Drawing Sheets

Token Table

| Index | Token |
|---|---|
| 1 | 1111 |
| 2 | 2222 |
| ... | ... |
| 11 | 1234 |
| 12 | 2323 |
| 13 | 3434 |
| 14 | 4321 |

Frequency Table

| Index | Frequency |
|---|---|
| 1 | 0.2 |
| 2 | 0.7 |
| ... | ... |
| 11 | 3.1 |
| 12 | 0.9 |
| 13 | 2.3 |
| 14 | 0.4 |

Ranking Table

| Ranking | Index to number |
|---|---|
| 1 | 11 |
| 2 | 13 |
| ... | ... |
| 11 | 12 |
| 12 | 2 |
| 13 | 14 |
| 14 | 1 |

(56) References Cited

U.S. PATENT DOCUMENTS

| | | | | |
|---|---|---|---|---|
| 9,171,173 B1* | 10/2015 | Rogers | | G06F 21/6209 |
| 2002/0152219 A1* | 10/2002 | Singh | | H04L 69/04 |
| 2007/0094285 A1* | 4/2007 | Agichtein | | G06F 16/243 |
| 2009/0222243 A1 | 9/2009 | Zoldi et al. | | |
| 2009/0271343 A1* | 10/2009 | Vaiciulis | | G06Q 40/00 |
| | | | | 706/21 |
| 2010/0036672 A1 | 2/2010 | Li et al. | | |
| 2010/0228580 A1* | 9/2010 | Zoldi | | G06Q 10/10 |
| | | | | 705/38 |
| 2011/0055074 A1 | 3/2011 | Chen et al. | | |
| 2012/0095999 A1* | 4/2012 | Donde | | G06F 16/3329 |
| | | | | 707/728 |
| 2012/0101937 A1 | 4/2012 | Zoldi et al. | | |
| 2012/0173465 A1* | 7/2012 | Hore | | G06N 20/00 |
| | | | | 706/12 |
| 2013/0339186 A1* | 12/2013 | French | | G06F 21/577 |
| | | | | 705/26.35 |
| 2015/0095247 A1* | 4/2015 | Duan | | G06Q 30/0185 |
| | | | | 705/318 |
| 2015/0161611 A1* | 6/2015 | Duke | | G06Q 20/4016 |
| | | | | 705/44 |
| 2015/0278817 A1* | 10/2015 | Abifaker | | G06Q 20/4016 |
| | | | | 705/44 |
| 2016/0203490 A1* | 7/2016 | Gupta | | G06Q 20/382 |
| | | | | 705/44 |
| 2016/0225048 A1* | 8/2016 | Zoldi | | G06Q 20/40145 |
| 2017/0011382 A1* | 1/2017 | Zoldi | | G06Q 20/3827 |
| 2017/0053282 A1* | 2/2017 | Olumofin | | G06Q 20/4016 |
| 2017/0270494 A1* | 9/2017 | Nayak | | G06Q 40/02 |
| 2018/0121922 A1* | 5/2018 | Zoldi | | G06Q 10/0635 |
| 2018/0157661 A1* | 6/2018 | Zoldi | | G06F 16/24578 |
| 2019/0340240 A1* | 11/2019 | Duta | | G06F 40/30 |

\* cited by examiner

Token Table

| Index | Token |
|---|---|
| 1 | 1111 |
| 2 | 2222 |
| ... | ... |
| 11 | 1234 |
| 12 | 2323 |
| 13 | 3434 |
| 14 | 4321 |

Frequency Table

| Index | Frequency |
|---|---|
| 1 | 0.2 |
| 2 | 0.7 |
| ... | ... |
| 11 | 3.1 |
| 12 | 0.9 |
| 13 | 2.3 |
| 14 | 0.4 |

Ranking Table

| Ranking | Index to number |
|---|---|
| 1 | 11 |
| 2 | 13 |
| ... | ... |
| 11 | 12 |
| 12 | 2 |
| 13 | 14 |
| 14 | 1 |

FIG. 4

| TFPR 1:1 | Fraud Transaction % | Fraud Amount % |
|---|---|---|
| Falcon Model | 65.18 | 71.65 |
| Pinpoint Model | 86.66 | 91.49 |
| % relative change | 32.96 | 27.68 |

FIG. 5

HIGH RESOLUTION TRANSACTION-LEVEL FRAUD DETECTION FOR PAYMENT CARDS IN A POTENTIAL STATE OF FRAUD

TECHNICAL FIELD

The subject matter described herein relates to fraud detection, and more particularly to high resolution transaction-level fraud detection for payment cards in a potential state of fraud.

BACKGROUND

Conventional fraud detection technology, such as the Falcon fraud detection technology developed by Fair Isaac Corporation, is designed to detect fraudulent financial payment cards and accounts. In the case of payment cards, entity transaction profiles contain recursively updated fraud feature detectors for the card based on the card history to enable real-time updates of variable estimates and the production of a neural network score that determines the likelihood that the card is in a state of fraud. In one example, Falcon models by design detect accounts in a state of fraud, and focus less on specific transactions that are fraudulent. In today's digital world, it is desirable for cards that are in a state of highly probable fraud to identify specific transactions that are most likely perpetrated by the fraudster versus the true customer. These digital systems enable automation of decline or reverse of specific transactions deemed likely not performed by the cardholder.

FIG. 1 illustrates a Falcon model, which takes the transaction and the entity profiles associated with the card to maintain a recursive set of input features. These feature detectors are updated with each transaction and are used in a neural network model to determine a probability that the card is in a state of fraud. In other words, Falcon models use profiles to keep a snapshot of an account's recent behavior and fraud feature detectors as demonstrated in FIG. 1. The Falcon model uses these stored profile feature detectors in the neural network training to produce a score reflecting the likelihood that the card is in a state of fraud.

The Falcon score directly depends on the state of these profiles. If the feature detectors focus on producing features that point to changes at the card level that are inconsistent with the cardholder or consistent with global fraudulent behaviors, then when a card has unusual transactions, it scores high. During this period, there can be both legitimate and fraudulent transactions when the account is in a probable fraudulent state. On average, about 60% of transactions inside a fraud window are legitimate transactions by the real cardholder. Many banks choose to block future transactions based on knowledge of the card account being in a state of fraud.

Falcon had substantially defined the payment fraud detection analytics state-of-the art for the past two decades. One key to Falcon is that the model detects cards in a state of fraud. These highly refined transactions enable analysts to review cards that may be in a state of fraud. Now with the increase in digital notification SMS, TXT, Apps that allow customers to triage legitimate vs. non-legitimate transactions coupled with the expectation that banks 'understand' customer behaviors requires a new transaction classification model to be applied on top of Falcon.

However, while blocking all transactions when the card account is in a state of fraud is a prudent practice, some banks want to determine which transactions are likely still legitimate and allow them to continue. Accordingly, what is needed is a system and method for high-resolution transaction-level fraud detection for payment cards in a potential state of fraud, in order to allow legitimate transactions to be executed.

SUMMARY

This document describes an analytic system and method to distinguish fraudulent transactions from a legitimate transaction, predicated on the notion that the card is considered likely to be in state of fraud. In other words, the disclosed system and method can be activated as soon as an account has suspicious activity that causes a high score for potential fraud, but before a bank either can or needs to confirm fraud. The system or method is able to pinpoint the actual fraudulent transactions inside a window of potential fraudulent activity, using a specialized model hereafter referred to as the "pinpoint model." This new analytic is better suited to automation of transaction reporting to customers for confirmation and/or reversal.

By training on the transaction data inside the fraud window, the pinpoint model is able to learn specific population dynamics unique to cards in a fraud episode. These include completely different fraud/non-fraud risk factors, fraud rates, and specific fraud tactics associated with fraudsters. The pinpoint model is a cascade model which focuses on cascade population characteristics to learn to differentiate between cardholder transactions vs. fraudster transactions. Examples of fraudster characteristics could include differing transaction values, ATM-cash behaviors/rates, predominance of certain merchant category codes compared to the legitimate cardholder, and others.

Beyond differences between fraud and legitimate transactions in this cascade region, the pinpoint model needs to very specifically understand typical behaviors of legitimate card holders—during these fraud episodes cardholders will have an expectation that the bank would understand their recurrent and typical behaviors. We will discuss technology to address this challenge.

In some aspects, a system, method and computer program product for scoring the legitimacy of specific and subsequent transactions by a payment card that is likely in a state of fraud are presented. The system, method and computer execute a process to receive transaction data for a transaction by a payment card associated with a fraud score indicating the payment card is likely in a state of fraud, the fraud score being generated by a fraud detection computing system in communication with the pinpoint processor, the transaction data including one or more attributes. The process further includes accessing, from a card profile associated with the payment card, a token table having an indexed table of n most frequent tokens associated with the payment card, a frequency table of pseudo-frequencies of the corresponding n most frequent tokens and linked with the token table by a common index, and a ranking table that provides a ranking of the tokens.

The process further includes executing a look-up of the token table based on the one or more attributes in the transaction data to determine a frequency and a rank of each of the one or more attributes that correspond with a token, and calculating one or more variables based on the frequency and the rank of each of the one or more attributes. The process further includes generating, using a pinpoint model, a score that represents a likelihood of the transaction being legitimate.

The process further includes updating the token table, the frequency table, and the ranking table based on the transaction data for access by the pinpoint processor for the subsequent transactions. In some aspects, the pinpoint model employs a Recursive Frequency List (RFL) to summarize a transaction history of the payment card and associated cardholder, as described in further detail below.

Implementations of the current subject matter can include, but are not limited to, systems and methods, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an example of a frequent-token list.

FIG. 5 illustrates superior transaction performance of a pinpoint model in detecting fraud transactions and fraudulent dollars over a base Falcon score.

When practical, similar reference numbers denote similar structures, features, or elements.

DETAILED DESCRIPTION

This document describes a system and method to determine and allow legitimate (i.e. non-fraud) financial transactions by a card to continue, when the card account is likely in a state of fraud. By doing so, implementing the disclosed system and method allows banks to minimize negative customer impact by allowing legitimate transactions to continue, removing highly likely fraud transactions from the account automatically, and allowing for fraud losses on these transactions to be reversed in a timely fashion.

Figure 1:
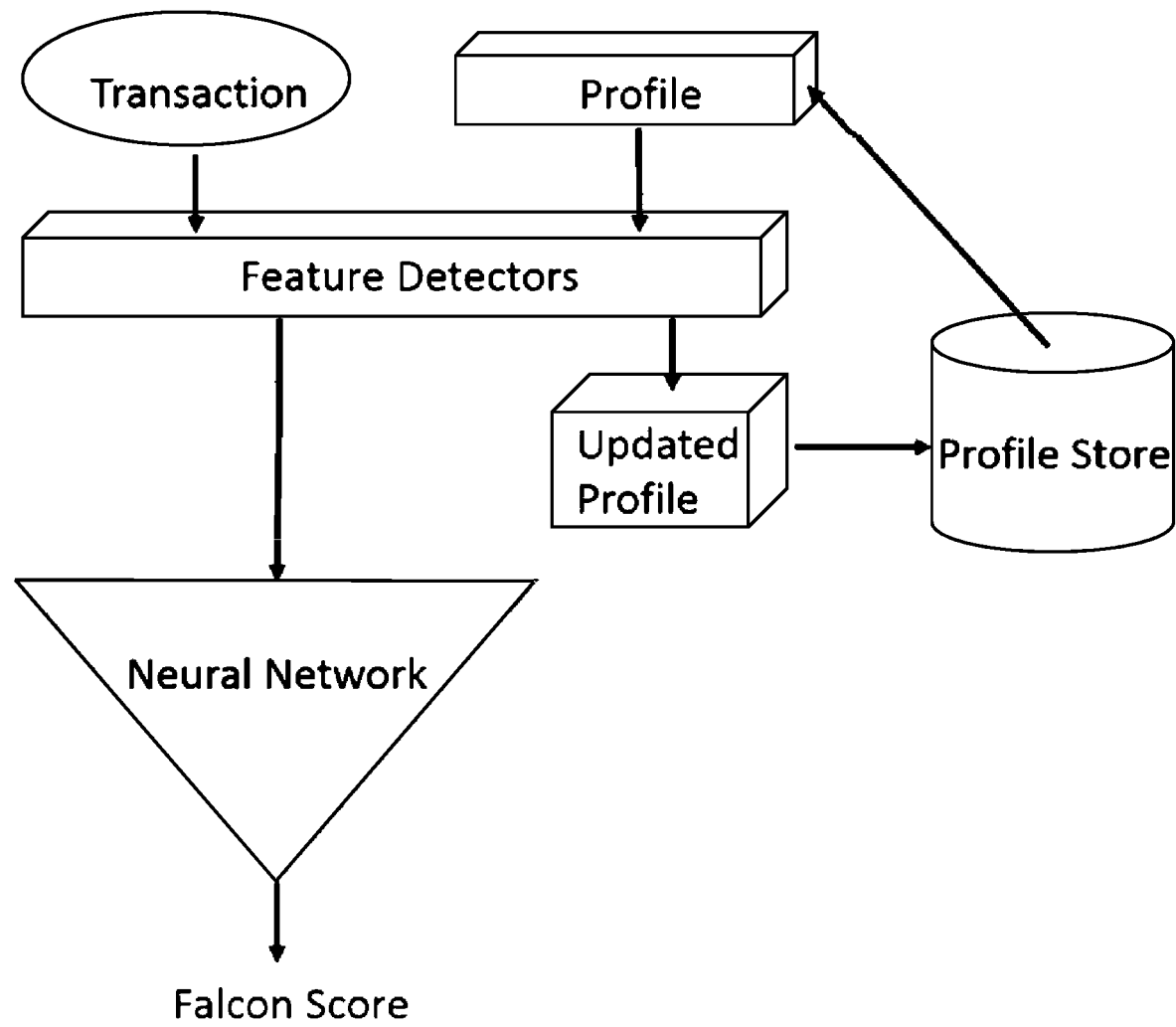
FIG. 1 illustrates a Falcon model that can be used to determine a probability that a payment card is in a state of fraud.
Figure 2:
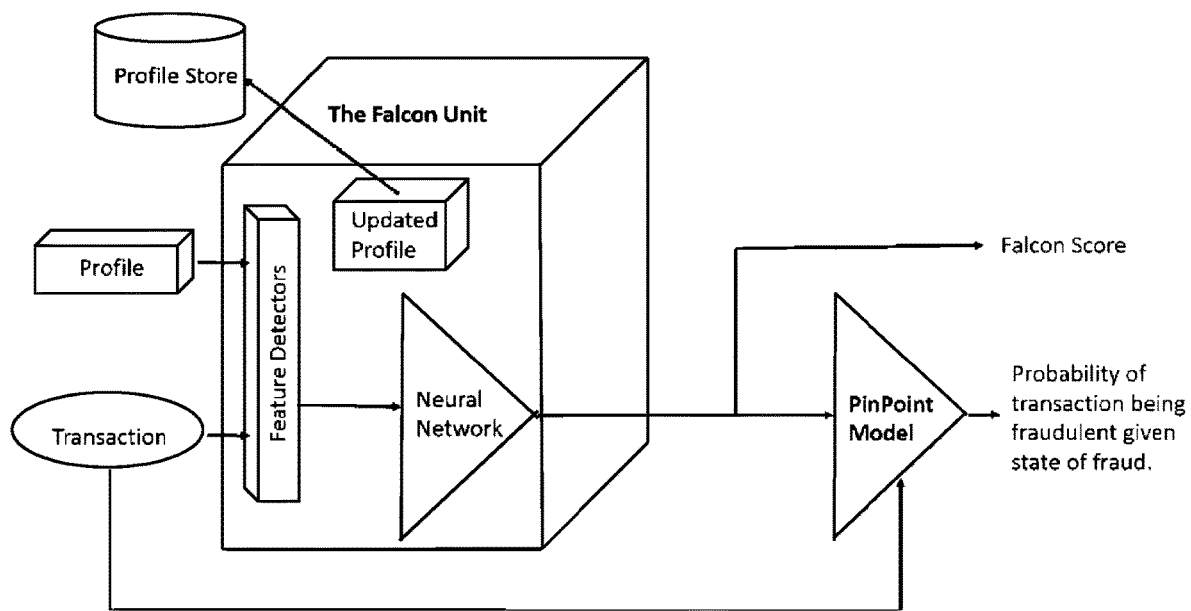
FIG. 2. illustrates a pinpoint model implemented by a computing system, and which, when a card account scores above a threshold indicating the card is likely in a state of fraud, and is then used to score the specific and subsequent transactions as whether they are legitimate or fraudulent.

In accordance with exemplary implementations, a "pinpoint model" is described herein. The pinpoint model is a model that distinguishes between fraudulent and legitimate transactions of a card account within a period of fraudulent activity. Once the card account is flagged by a fraud detection system as likely being in a state of fraud, the pinpoint model can differentiate specific transactions as being likely either those of the legitimate cardholder or of a fraudster. The operational flow of the pinpoint model is shown in FIG. 2. When a card account scores above a threshold indicating the card is likely in a state of fraud, the pinpoint model is then used to score the specific and subsequent transactions as whether they are legitimate or fraudulent.

Figure 3:
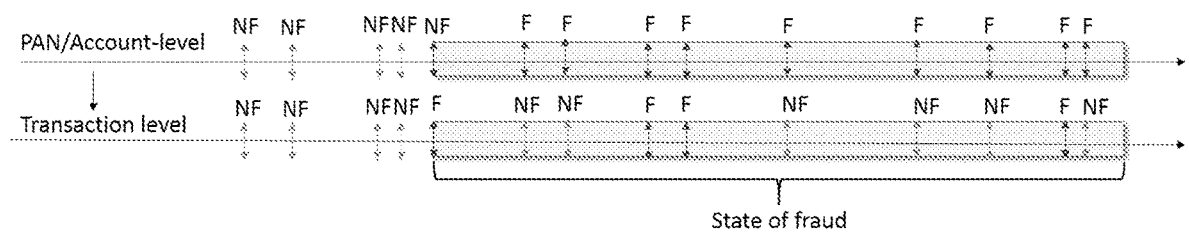
FIG. 3 illustrates PAN/Account level fraud analytics results compared with transaction-level fraud analytics results as determined by a pinpoint model.

The pinpoint model is trained on transactions within the fraud window for a payment card. This model is focused on a highly enriched transaction environment where there is a high probability of transactions being actual fraud. The model then focuses on only the class of transactions occurring during these episodes of fraud on the payment card to focus the score on differentiating between legitimate and illegitimate transaction data. A visualization of this is shown in FIG. 3. The Falcon model is trained on PAN-level tagged data. As shown here, once an account is perceived to be in a state of fraud, all transactions inside the fraud window are perceived fraudulent by the Falcon model, which is focused on card fraud probability. The pinpoint models focus on leveraging Falcon to detect fraudulent cards, and then differentiating between legitimate and fraudulent transactions in the perceived likely fraud episode.

The pinpoint model subsequently is trained on a dataset that is a small fraction of the data on which the Falcon model is trained, but has completely different characteristics. For example, the transaction fraud rate inside the fraud episode is about 60%, as such a much enriched fraud/non-fraud population compared to the base Falcon model which drives detection of fraud on the payment cards.

These cascade models allow transactions to be identified as fraudulent based on detailed models that determine whether the transaction meets a customer's recurrences in their transaction history and the details of how fraud is occurring in the ecosystem. The best of these pinpoint models are fully adaptive that respond and continuously reweight based on recently worked fraud and non-fraud transactions within a fraud case.

The pinpoint model employs a Recursive Frequency List (RFL) to mathematically summarize the cardholder's transaction history. These RFL lists are very important as these recurrent behaviors are extremely hard, if not impossible, for fraudsters to replicate unless they observe all prior transaction history. In situations where card numbers and details are purchased on the dark web, i.e. part of the Web not indexed by search engines, these transaction histories and in fact the specific identification and subsequent observation of cardholders are not only unlikely but cost prohibitive. Therefore, focusing on understanding recurrences of legitimate behavior can help drive better transaction models in the cascade region, e.g. transactions at the same grocery stores, gas stations, ATMs, CNP merchants, etc., (and such transactions are likely the cardholder), versus transactions with new merchants that are more likely to be fraudulent and not legitimate.

The Recursive Frequency List utilizes the following three tables, stored in a card profile in a memory, and accessible by a fraud score computing system:
1. A table of most frequent tokens ("token table")
2. A table of pseudo-frequencies of the corresponding most frequent tokens ("frequency table")
3. A table of ranking for these tokens ("ranking table")

These three tables are collectively referred to as the Recursive Frequency List in the following description. It should be noted that the "frequencies" stored in the frequency table are not true "frequencies" but are pseudo-frequencies that approximate or estimate the true frequencies and apply over a decayed time or event window.

For illustrative purposes, the following is an example of a frequent-token list, as shown in FIG. 4. At least one token table and at least one frequency table are coupled via common indices. From the token table and frequency table, the frequency for token "1111" (with index 1 in the token table) is 0.2. The frequency for token "2222" (with index 2 in the Token table) is 0.7. The frequency for token "4321" (with index 14) is 0.4. The ranking table stores the common indices of token table and frequency table in the decreasing order of the frequency. For example, referring to the ranking table, index 11 in the token table (corresponding to token "1234") has the highest frequency (3.1), index 13 (corresponding to the token "3434") the second-highest frequency (2.3), and so on.

Upon each transaction, the system looks up the respective token table to determine whether the associated attribute is frequently occurring for that cardholder utilizing the rank of the token from the ranking table. These tokens could include any of the following attributes:
  Postal code
  Merchant ID
  Merchant category code
  CNP transaction amount
  High dollar amounts
  Dollar amount×MCC
  ATM ID
  Country code
  Etc.

Then, various variables are calculated based on whether transaction and associated extracted token(s) are frequent or not. Once the lookup is complete, the tables are updated as follows:
  All the frequencies in the frequency table are decayed by a multiplicative factor $\beta$, $0<\beta<1$;
  Then, token table and frequency table are updated as follows:
    If the current token is not in the token table, then the least-frequent token (determined by the ranking table) is replaced with the current token if the least frequent token's frequency (based on the frequency table) is less than a threshold $\delta$, $$0 < \delta < \frac{1}{1-\beta}.$$

In another implementation for determining the threshold $\delta$, adaptive thresholds can be used based on match rates and recycling rates associated with the token table. The frequency of the current token is initialized to be $\alpha$.
  If the current token is already in the token table, then its frequency is increased by $\lambda$
  Finally, the ranking table is updated accordingly to reflect any changes to the ranking of tokens in the token table based on the update.

"Frequencies" in the frequency table are not true frequencies but based on a ranking associated with the values of $\alpha$, $\beta$, and $\lambda$ which are dependent on application and can vary based on the type of transaction tokens being monitored in the token table.

Placement on the recurrence tables can then drive whether or not the specific transaction is likely that of the cardholder, recognizing that fraudsters rarely have such detailed understanding of the cardholder's transaction behaviors for the card data that they compromise or purchase from the dark web. References to recurrence lists are included in U.S. Pat. No. 8,090,648 USPO.

Adaptive Analytics

Given that pinpoint is operating on specific fraud episode activity and fraudsters change their behavior over time, pinpoint models require utilizing adaptive model updates/learning. Adaptive analytics is discussed in U.S. patent application Ser. No. 12/040,796, which is incorporated by reference herein for all purposes. In some implementations, a Naïve Bayesian (NB) adaptive learner model can be used. This model operates on a fixed size of live training exemplars where models are made adaptive by continuously updating fraud and non-fraud first-in-first-out (FIFO) queues (also referred to as fraud and non-fraud tables) from which model parameters are estimated. The FIFO queues are populated with transaction records labeled by a fraud analyst.

A fraud tag that specifies whether each record is fraudulent or non-fraudulent, and the model is regularly updated based on this rotating set of fraud and non-fraud examples. The model is trained to produce a score that indicates the probability of fraud. These fraud/non-fraud queues are important to reflect the current fraud rates associated with the current fraud attack vectors and allows for improved analytics compared to static models which have dated historical relationships between fraud and non-fraud transactions. Model parameters can include the prior probabilities (the priors), which are the overall probability of a record being fraud and the overall probability of a record being non-fraud in the feedback data.

Once the fraud and non-fraud transaction tables are full, insertion of a new record causes the oldest record in the corresponding table to be removed in a first-in, first-out (FIFO) mode. In the case of the Naïve Bayes classifier, separate frequency tables are also maintained and updated for each feature with the counts of records having values in the individual bins. It should be apparent to those skilled in the art that for continuous variables binning technologies can be applied to make all features discrete to facilitate use of Naïve Bayes classifiers. It should also be apparent to those skilled in the art that a variety of other classifiers can be applied to these fraud and non-fraud tables.

Records to be scored are presented to the model and the model computes the likelihoods of the input data values given that the record is fraudulent and given that the record is non-fraudulent. These likelihoods are combined with the prior probabilities to calculate the marginal probabilities of the input data. The marginal probabilities are combined via Bayes formula (Equation 1: Bayes Equation) to compute the posterior probability. The posterior or some value monotonically related to the posterior becomes the output score.

$$P(\text{fraud} | X) = \frac{P(X | \text{fraud})P(\text{fraud})}{P(X)} \quad \text{(Eq. 1)}$$

$$\text{posterior} = \frac{\text{likelihood} \times \text{fraud marginal}}{\text{record marginal}} \quad \text{(Eq. 2)}$$

Pinpoint Model Transaction Performance

As explained above, pinpoint model employed focuses on transaction classification based on identification of cards with a high likelihood of being in a state of fraud. This transaction dataset focuses on the transaction characteristics of the highest fraud risk transactions. The models utilize both transaction characteristics to monitor the fraud attack tactics and recurrence list transaction activity to determine, using adaptive model technology (or static models), which transactions are most likely legitimate in the fraud window. The cascade Falcon score threshold for determining cards in a likely state of fraud is variable, and once set, the pinpoint model can find the appropriate weighting of transaction model features to classify transactions.

To compare transaction-level performance, the same false positive ratio (TFPR) is compared. The TFPR measures the number of legitimate transactions flagged incorrectly for each fraud transaction correctly identified. To show the value of using pinpoint models, an improvement over the standard Falcon model used by the majority of card issuers today can be shown. As shown in FIG. 5, at TFPR 1:1, the pinpoint model detects 86.66% of fraudulent transactions and 91.49% of fraudulent dollars. This is roughly 30% better relative performance on correctly rank-ordering transactions in terms of legitimate fraud within the fraud window.

At a TFPR of 0.5:1, the pinpoint model detects 56.66% of the fraudulent dollars and 45.66% of fraudulent transactions. The standard Falcon score in this evaluation was unable to meet a 0.5:1 TFPR. This demonstrates that, for banks that want a strong fraud transaction identification at a rate of two fraud transactions to one non-fraud transaction flagged ratio, pinpoint is a preferred option.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying FIG.s and/or described herein do not necessarily require the particular order shown, or sequential order, to achieve desirable results. Other implementations may be within the scope of the following claims.

What is claimed is:

1. A method for scoring the legitimacy of specific and subsequent transactions by a payment card that is likely in a state of fraud, the method comprising:

receiving, by a processor and based on a fraud detection system in communication with the processor, an indication that a payment card is likely in a state of fraud, the indication based on a fraud score of the fraud detection system, fraud score based on one of more transactions of the payment card and at least one entity profile associated with the payment card;

receiving, by the processor and for a period when the fraud score indicates the payment card is likely in a state of fraud, transaction data for at least one transaction of the payment card, the transaction data including one or more attributes;

accessing, by the processor from a card profile associated with the payment card and in response to receiving the transaction data and in response to receiving the indication, a token table having an indexed table of n most frequent tokens associated with the payment card, a frequency table of pseudo-frequencies of the corresponding n most frequent tokens and linked with the token table by a common index, and a ranking table that provides a ranking of the tokens and stores common indices of the token table and the frequency table in a decreasing order of the pseudo-frequencies of the frequency table;

performing, by the processor and in response to receiving the transaction data, a look-up of the token table based on the one or more attributes in the transaction data to determine a frequency and a rank of each of the one or more attributes that correspond with a token by utilizing the rank of the token from the ranking table;

updating, by the processor and in response to performing the look-up, the token table, the frequency table, and the ranking table based on the transaction data for scoring the legitimacy of the subsequent transactions, the updating comprising: decaying all frequencies in the frequency table, increasing a frequency of the token in the token table if the token is already in the token table, replacing a least-frequent token determined by the ranking table with the token if the token is not in the token table and if the frequency of the least-frequent token is less than a threshold, and updating the ranking table to reflect changes to the ranking of tokens in the token table based on the updating;

generating, by the processor using a model and responsive to the fraud score exceeding a threshold and responsive to the fraud score indicating the payment card is likely in a state of fraud, a score that represents a likelihood of the at least one transaction being legitimate, the model employing a Recursive Frequency List (RFL) to summarize a transaction history of the payment card and associated cardholder, the RFL comprising the token table, the frequency table, and the ranking table, the model being trained using continuously updated, on a first-in-first-out basis, separately determined probabilities of fraudulent and legitimate transactions and one or more historical relationships between fraudulent and legitimate transactions, the trained model being used to distinguish between fraudulent and legitimate transactions of the payment card within a period of payment card is likely in a state of fraud; and authorizing, based on the score using the model, the at least one transaction associated with the payment card.

2. The method in accordance with claim 1, wherein the attributes include one or more geographical attributes related to the transaction.

3. The method in accordance with claim 2, wherein the one or more geographical attributes include a postal code, a merchant identifier, an automated teller machine identifier, or a country code.

4. The method in accordance with claim 1, wherein the attributes include one or more financial transaction attributes related to the transaction.

5. The method in accordance with claim 4, wherein the one or more financial transaction attributes include a merchant category code, a card-not-present transaction amount, a transaction amount exceeding a threshold, and a dollar amount per merchant category code.

6. A system for scoring the legitimacy of specific and subsequent transactions by a payment card that is likely in a state of fraud, the system comprising:

a database storing a card profile associated with the payment card, the card profile including a token table having an indexed table of n most frequent tokens associated with the payment card, a frequency table of pseudo-frequencies of the corresponding n most frequent tokens and linked with the token table by a common index, and a ranking table that provides a ranking of the tokens and stores common indices of the token table and the frequency table in a decreasing order of the pseudo-frequencies of the frequency table; and a processor connected with a fraud detection computing system for receiving transaction data for a transaction by a payment card associated with a fraud score indicating the payment card is likely in a state of fraud, the fraud score being generated by the fraud detection computing system, the transaction data including one or more attributes, the processor further being configured to:

receive an indication that a payment card the payment card is likely in a state of fraud, the fraud score being generated by the fraud detection computing system based on a fraud score of the fraud detection system, fraud score based on one of more transactions of the payment card and at least one entity profile associated with the payment card, receive, for a period when the fraud score indicates the payment card is likely in a state of fraud, transaction data for at least one transaction of the payment card, the transaction data including one or more attributes, access, in response to receiving the transaction data and in response to receiving the indication, the card profile from the database, perform, in response to receiving the transaction data, a look-up of the token table based on the one or more attributes in the transaction data to determine a frequency and a rank of each of the one or more attributes that correspond with a token by utilizing the rank of the token from the ranking table, calculate one or more variables based on the frequency and the rank of each of the one or more attributes, update, in response to performing the look-up, the token table, the frequency table, and the ranking table based on the transaction data for scoring the legitimacy of the subsequent transactions by: decaying all frequencies in the frequency table, increasing a frequency of the token in the token table if the token is already in the token table, replacing a least-frequent token determined by the ranking table with the token if the token is not in the token table and if the frequency of the least-frequent token is less than a threshold, and updating the ranking table to reflect changes to the ranking of tokens in the token table based on the update;

generate, using a model and responsive to the fraud score exceeding a threshold and responsive to the fraud score indicating the payment card is likely in a state of fraud, a score that represents a likelihood of the transaction being legitimate, the model employing a Recursive Frequency List (RFL) to summarize a transaction history of the payment card and associated cardholder, the RFL comprising the token table, the frequency table, and the ranking table, the model being trained using continuously updated, on a first-in-first-out basis, separately determined probabilities of fraudulent and legitimate transactions and one or more historical relationships between fraudulent and legitimate transactions, the trained model being used to distinguish between fraudulent and legitimate transactions of the payment card within a period of payment card is likely in a state of fraud; and authorize, based on the score using the model, the at least one transaction associated with the payment card.

7. The system in accordance with claim 6, wherein the attributes include one or more geographical attributes related to the transaction.

8. The system in accordance with claim 7, wherein the one or more geographical attributes include a postal code, a merchant identifier, an automated teller machine identifier, or a country code.

9. The system in accordance with claim 6, wherein the attributes include one or more financial transaction attributes related to the transaction.

10. The system in accordance with claim 9, wherein the one or more financial transaction attributes include a merchant category code, a card-not-present transaction amount, a transaction amount exceeding a threshold, and a dollar amount per merchant category code.

11. A system for scoring the legitimacy of specific and subsequent transactions by a payment card that is likely in a state of fraud, the system comprising:

at least one hardware data processor; and at least one memory storing instructions which, when executed by the at least one data processor, result in operations comprising:

receive, based on a fraud detection system in communication with the processor, an indication that a payment card is likely in a state of fraud, the indication based on a fraud score of the fraud detection system, fraud score based on one or more transactions of the payment card and at least one entity profile associated with the payment card; receive, for a period when the fraud score indicates the payment card is likely in a state of fraud, transaction data for at least one transaction of the payment card, the transaction data including one or more attributes;

access, from a card profile associated with the payment card and in response to receiving the transaction data and in response to receiving the indication, a token table having an indexed table of n most frequent tokens associated with the payment card, a frequency table of pseudo-frequencies of the corresponding n most frequent tokens and linked with the token table by a common index, and a ranking table that provides a ranking of the tokens and stores common indices of the token table and the frequency table in a decreasing order of the pseudo-frequencies of the frequency table;

execute, in response to receiving the transaction data, a look-up of the token table based on the one or more attributes in the transaction data to determine a frequency and a rank of each of the one or more attributes that correspond with a token by utilizing the rank of the token from the ranking table;

update, in response to performing the look-up, the token table, the frequency table, and the ranking table based on the transaction data for scoring the legitimacy of the subsequent transactions by: decaying all frequencies in the frequency table, increasing a frequency of the token in the token table if the token is already in the token table, replacing a least-frequent token determined by the ranking table with the token if the token is not in the token table and if the frequency of the least-frequent token is less than a threshold, and updating the ranking table to reflect changes to the ranking of tokens in the token table based on the update;

calculate one or more variables based on the frequency and the rank of each of the one or more attributes;

generate, using a model and responsive to the fraud score exceeding a threshold and responsive to the fraud score indicating the payment card is likely in a state of fraud, a score that represents a likelihood of the transaction being legitimate, the model employing a Recursive Frequency List (RFL) to summarize a transaction history of the payment card and associated cardholder, the RFL comprising the token table, the frequency table, and the ranking table, the model being trained using continuously updated, on a first-in-first-out basis, separately determined probabilities of fraudulent and legitimate transactions and one or more historical relationships between fraudulent and legitimate transactions, the trained model being used to distinguish between fraudulent and legitimate transactions of the payment card within a period of payment card is likely in a state of fraud; and authorize, based on the score using the model, the at least one transaction associated with the payment card.

12. The system in accordance with claim 11, wherein the attributes include one or more geographical attributes related to the transaction.

13. The system in accordance with claim 12, wherein the one or more geographical attributes include a postal code, a merchant identifier, an automated teller machine identifier, or a country code.

14. The system in accordance with claim 11, wherein the attributes include one or more financial transaction attributes related to the transaction.

15. The system in accordance with claim 14, wherein the one or more financial transaction attributes include a merchant category code, a card-not-present transaction amount, a transaction amount exceeding a threshold, and a dollar amount per merchant category code.

* * * * *